(12) United States Patent
Jhala et al.

(10) Patent No.: US 7,552,112 B2
(45) Date of Patent: Jun. 23, 2009

(54) DISCOVERING ASSOCIATIVE INTENT QUERIES FROM SEARCH WEB LOGS

(75) Inventors: Pradhuman Jhala, Glendale, CA (US); Benjamin Rey, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 163 days.

(21) Appl. No.: 11/522,638

(22) Filed: Sep. 18, 2006

(65) Prior Publication Data

US 2008/0071740 A1  Mar. 20, 2008

(51) Int. Cl.
*G06F 17/30* (2006.01)
*G06F 7/00* (2006.01)

(52) U.S. Cl. .................... 707/3; 707/2; 707/4; 707/10
(58) Field of Classification Search ................ None
See application file for complete search history.

(56) References Cited

U.S. PATENT DOCUMENTS

| | | | |
|---|---|---|---|
| 5,047,876 A * | 9/1991 | Genheimer et al. | 360/46 |
| 5,808,615 A * | 9/1998 | Hill et al. | 715/853 |
| 5,933,818 A * | 8/1999 | Kasravi et al. | 706/12 |
| 6,389,406 B1 * | 5/2002 | Reed et al. | 706/46 |
| 6,502,091 B1 * | 12/2002 | Chundi et al. | 707/3 |
| 6,836,773 B2 * | 12/2004 | Tamayo et al. | 707/6 |
| 7,007,017 B2 * | 2/2006 | Bergholz et al. | 707/4 |
| 7,031,961 B2 * | 4/2006 | Pitkow et al. | 707/4 |
| 7,092,936 B1 * | 8/2006 | Alonso et al. | 707/3 |
| 2002/0042923 A1 * | 4/2002 | Asmussen et al. | 725/92 |
| 2003/0014399 A1 * | 1/2003 | Hansen et al. | 707/3 |
| 2007/0038602 A1 | 2/2007 | Weyand et al. | |
| 2007/0038621 A1 | 2/2007 | Weyand et al. | |

OTHER PUBLICATIONS

Chien, S., et al., "Semantic Similarity Between Search Engine Queries Using Temporal Correlation," *Proceedings of the 14th ACM International Conference on World Wide Web (WWW'05)*, Chiba, Japan, 11 pages (2005).

Dunning, Ted, "Accurate Methods for the Statistics of Surprise and Coincidence," 19(1) *Computational Linguistics* 61-74 (1993).

Fonseca, B., et al., "Concept-Based Interactive Query Expansion," *Proceedings of the 14th ACM International Conference on Information and Knowledge Management (CIKM'05)*, Brement, Germany, pp. 696-703 (2005).

(Continued)

*Primary Examiner*—Greta L Robinson
*Assistant Examiner*—James J Wilcox
(74) *Attorney, Agent, or Firm*—Nathan O. Greene; Brinks Hofer Gilson & Lione

(57) ABSTRACT

A system is described for discovering associative intent queries based on search web logs. The system may mine one or more user sessions comprising data from search engine query logs and generate query pairs based on the data. The system may use statistics and morphology to identify relationships among the query pairs. From these relationships, the system may distinguish the associative intent query pairs from the similar and unrelated intent query pairs.

24 Claims, 7 Drawing Sheets

OTHER PUBLICATIONS

Jones, R., et al., "Generating Query Substitutions," *WWW2006*, Edinburgh, UK, 10 pages (May 22-26, 2006).

Rey, B., et al., "Mining Associations from Web Query Logs," *Workshop on Web Mining 2006* (*WebMine*), ECML PKDD 2006, Berlin, Germany, 6 pages) (Sep. 18, 2006).

Shi, X., et al., "Mining Related Queries from Search Engine Query Logs," *Proceedings 222'06*, ACM Press, New York, NY, pp. 943-944 (2006).

Walters, R., et al., "A Structural Equations Analysis of the Impact of Price Promotions on Store Performance," 25(1) *Journal of Marketing Research* 51-63 (Feb. 1988).

Zhang, Z., et al., "Mining Search Engine Query Logs for Query Recommendation,"*WWW 2006*, Edinburgh, Scotland, 2 pages (May 22-26, 2006).

\* cited by examiner

FIG. 2

| | Search Query | User ID | Query Time |
|---|---|---|---|
| | | | *Morning* |
| | Leather sofa | $ID_X$ | $T_1$ |
| | Leather sofa bed | $ID_X$ | $T_2$ |
| | Leather couch | $ID_X$ | $T_3$ |
| | | | *Afternoon* |
| | Coffee table | $ID_X$ | $T_4$ |
| | Cocktail table | $ID_X$ | $T_5$ |
| | | | *Evening* |
| | Tickets Los Angeles Lakers | $ID_X$ | $T_6$ |
| | Tickets Staple Center LA Lakers | $ID_X$ | $T_7$ |

| User ID | Consecutive Query Pairs |
|---|---|
| $ID_X$ | Leather sofa / Leather sofa bed |
| $ID_X$ | Leather sofa bed / Leather couch |
| $ID_X$ | Leather couch / Coffee table |
| $ID_X$ | Coffee table / Cocktail table |
| $ID_X$ | Cocktail table / Tickets Los Angeles Lakers |
| $ID_X$ | Tickets Los Angeles Lakers / Tickets Staple Center LA Lakers |

FIG. 4

| User ID | Query Pair Permutations |
|---|---|
| $ID_x$ | Leather sofa / Leather sofa bed |
| $ID_x$ | Leather sofa / Leather couch |
| $ID_x$ | Leather sofa / Coffee table |
| $ID_x$ | Leather sofa / Cocktail table |
| $ID_x$ | Leather sofa / Tickets Los Angeles Lakers |
| $ID_x$ | Leather sofa / Tickets Staple Center LA Lakers |
| $ID_x$ | Leather sofa bed / Leather couch |
| $ID_x$ | Leather sofa bed / Coffee table |
| $ID_x$ | Leather sofa bed / Cocktail table |
| $ID_x$ | Leather sofa bed / Tickets Los Angeles Lakers |
| $ID_x$ | Leather sofa bed / Tickets Staple Center LA Lakers |
| $ID_x$ | Leather couch / Coffee table |
| $ID_x$ | Leather couch / Cocktail table |
| $ID_x$ | Leather couch / Tickets Los Angeles Lakers |
| $ID_x$ | Leather couch / Tickets Staple Center LA Lakers |
| $ID_x$ | Coffee table / Cocktail table |
| $ID_x$ | Coffee table / Tickets Los Angeles Lakers |
| $ID_x$ | Coffee table / Tickets Staple Center LA Lakers |
| $ID_x$ | Cocktail table / Tickets Los Angeles Lakers |
| $ID_x$ | Cocktail table / Tickets Staple Center LA Lakers |
| $ID_x$ | Tickets Los Angeles Lakers / Tickets Staple Center LA Lakers |

FIG. 6

| User ID | Query Pair Permutations | Keep or Discard | Reason |
|---|---|---|---|
| $ID_x$ | Leahter sofa / Leather sofa bed | Discard | Edit Distance Test |
| $ID_x$ | Leather sofa / Leather sofa bed | Discard | Prefix overlap test |
| $ID_x$ | Leather sofa / Leather couch | Discard | Substitutable |
| $ID_x$ | Leather sofa / Coffee table | Keep | Associated Query Pair |
| $ID_x$ | Leather sofa / Cocktail table | Keep | Associated Query Pair |
| $ID_x$ | Leather sofa / Tickets Los Angeles Lakers | Keep | Unrelated Query Pair |
| $ID_x$ | Leather sofa / Tickets Staple Center LA Lakers | Keep | Unrelated Query Pair |
| $ID_x$ | Leather sofa bed / Leather couch | Discard | Substituable |
| ... | ... | ... | ... |
| $ID_x$ | Tickets Los Angeles Lakers / Tickets Staple Center LA Lakers | Discard | Token Number Test |

FIG. 7

| $q_1$ | Freq $(q_1)$ | $q_2$ | Freq $(q_2)$ | Freq $(q_1 / q_2)$ | LLR Value $(q_1 / q_2)$ |
|---|---|---|---|---|---|
| Leather sofa | 2072 | Coffee table | 3115 | 51 | 779.2 |
| Leather sofa | 2072 | Cocktail table | 2301 | 87 | 1478.2 |
| Leather sofa | 2072 | Tickets Los Angeles Lakers | 175 | 2 | 29.0 |
| Leather sofa | 2072 | Tickets Staple Center | 351 | 1 | 11.7 |
| Leather sofa bed | 97 | Coffee Table | 3115 | 17 | 329.0 |
| ... | | ... | | | |

DISCOVERING ASSOCIATIVE INTENT QUERIES FROM SEARCH WEB LOGS

COPYRIGHT NOTICE

A portion of the disclosure of this patent document contains material which is subject to copyright protection. The copyright owner has no objection to the facsimile reproduction by anyone of the patent document of the patent disclosure, as it appears in the patent and Trademark Office patent file or records, but otherwise reserves all copyright rights whatsoever.

BACKGROUND OF THE INVENTION

1. Technical Field

The disclosed embodiments relate to a data processing system for discovering associative intent queries from search web logs.

2. Related Art

Computer users may request information by formulating a search query and submitting the search query to an Internet search engine, intranet search engine, personal search engine, or mobile search engine, etc., collectively referred to as a search engine. In response thereto, the search engine may retrieve information from a database, index, catalog, etc. or directly from the Internet or intranet, that it deems relevant based on the search query and display this information to the user. Generally, the search engine locates the information by matching the key words contained within the search query with an index of stored information relating to a large number of web pages available via the network, e.g. the Internet or an intranet, etc. or database files available via a personal computer or mobile device, etc. The search engine may then display the resultant information as a list of the best-matching web pages or database files to the user. However, it would be desirable for the search engine to offer suggestions to the user of other queries, associated with the user's submitted query that may provide additional and/or alternative results. It would also be desirable for a search engine advertising tool or network advertiser, etc. to offer more diverse advertisements to the user based on the associative intent queries.

SUMMARY

By way of introduction, the embodiments described below include a system and method for discovering associative intent queries from search web logs. The embodiments relate to discovering relationships among query pairs. The embodiments further relate to discovering one or more associative intent queries based on these relationships.

In a first aspect, a method is disclosed for discovering an associated query pair including: mining a user session derived from a query log database, generating a set of query pairs based on the user session, removing a similar query pair from the set of query pairs, and discovering an associated query pair from the set of remaining query pairs.

In a second aspect, a method is disclosed for discovering an associated query pair including: generating a group of query pairs based on a user session, removing a similar query pair from the group of query pairs, and performing a statistical test on the group of remaining query pairs to discover an associated query pair.

In a third aspect, a system is disclosed for identifying an associated query pair including: a query log processor operable to mine a user session, a permutation processor coupled with the query log processor and operable to generate a set of query pairs based on the user session, a subtractor coupled with the query processor and operable to remove a similar query pair from the set of query pairs, and an associative log-likelihood ratio (LLR) processor coupled with the subtractor and operable to identify an associated query pair from the set of remaining query pairs.

In a fourth aspect, a system is disclosed for discovering an associated query pair including: means for mining a user session derived from a query log database, means, coupled with the means for mining, for generating a set of query pairs based on the user session, means, coupled with the means for generating, for removing a similar query pair from the set of query pairs, and means, coupled with the means for removing, for discovering an associated query pair from the set of remaining query pairs.

In a fifth aspect, a system is disclosed including computer programming logic stored in a memory and executable by a processor coupled with the memory, the computer programming logic including: first logic operative to mine a user session derived from a query log database, second logic coupled with the first logic and operative to generate a set of query pairs based on the user session, third logic coupled with the second logic and operative to remove a similar query pair from the set of query pairs, and fourth logic coupled with the third logic and operative to discover an associated query pair from the set of remaining query pairs.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is a table of exemplary query records that belong to a User X.

FIG. 3 is a table of exemplary consecutive query pairs generated from queries submitted by User X.

FIG. 4 is a table of exemplary query pair permutations generated from queries submitted by User X.

FIG. 6 is a table showing exemplary substitutable query pairs removed from the exemplary query pair permutations generated from queries submitted by User X.

FIG. 7 is a table of exemplary weights and LLR values computed for a number of query pairs based on queries submitted by User X.

DETAILED DESCRIPTION OF THE PREFERRED EMBODIMENTS

The disclosed embodiments provide a system 2 for discovering associative intent queries from search web logs. The system 2 mines user search queries stored in a query log database 4. The query log database 4 comprises a compilation of query logs containing information about a number of search queries submitted to a search engine by a number of users. The system 2 groups the search queries into query pairs to determine one or more relationships between the pairs through the use of statistic and semantic tests. From these relationships, the system 2 is capable of discovering and/or deriving associative intent query pairs submitted by the users.

The associative intent query pairs may be used by a search engine to offer search suggestions to users that are associated with, but not necessarily directly related to, the user's submitted search query. The associated query suggestions may provide the user with additional and/or alternative search results and may also help focus, expand, or diversify the user's searching. The associative intent query pairs may also be used by an advertising search engine, a network advertiser, etc. to offer more diverse advertisements to the user. Generally, the Internet, or intranet, etc. contains at least one document including at least one, if not all, of the user's search terms. This is not always the case for advertisement searches. The set of advertisement results is much smaller than the set of Internet, or intranet, etc. documents. Thus, attempting to match a user's search query with advertisements may not always yield a match. As a result, the ability to modify a user's search query (which may not have an advertiser) to an associative intent query (which does have an advertiser) may be extremely valuable.

Figure 1:
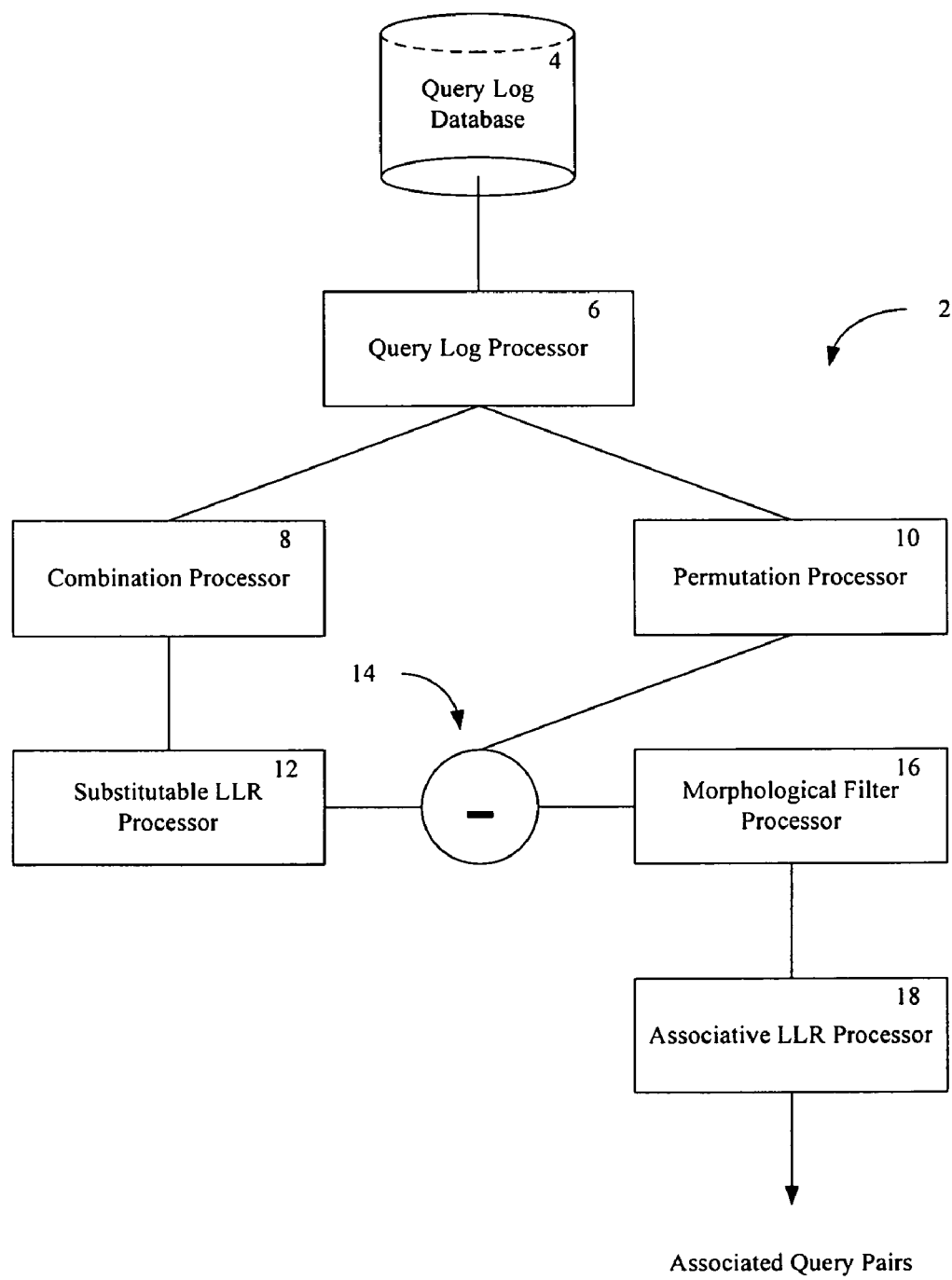
FIG. 1 is a block diagram of an exemplary system for discovering associative intent queries from search web logs, according to one embodiment.

An exemplary system 2 for discovering associative intent queries from search web logs according to one embodiment is shown in FIG. 1. As will be described, associative intent queries, also referred to as associated queries, are alternative, augmented, or otherwise related search queries which are generated based on an analysis of one or more actual search queries proposed or provided by one or more users. The system 2 may generate the associated queries based on the assumption that there are particular types of relationships between search queries: similar queries, associative queries, and unrelated queries. It will be appreciated that there may be other relationships among search queries which may also be utilized, in place of or in addition to these relationship types, by the disclosed embodiments.

Similar queries, also referred to as substitutable queries, are queries that are interchangeable and/or semantically similar to the initial query, such as spelling changes, synonym substitutions, generalizations, specifications, or combinations thereof, e.g. execution of a similar query produces substantially similar sets of query results in relation to the initial query. Thus, if a user is satisfied with the search results from the initial query, the user often has no need for search results from a substitutable query. Examples of substitutable queries may be "baby toys" for the initial query of "infant toys," "leather sofa" for the initial query of "leather couch," and "coffee table" for the initial query of "cocktail table."

Associated queries are queries that may not be interchangeable, e.g. the result sets of each query may or may not overlap but are related. In other words, if a user is satisfied with the search results from the initial query, the user may still benefit from the additional results of the associated query. Examples of associated queries may be "ski gloves" for the initial query of "skis," "baby toys" for the initial query of "baby stroller," and "leather sofa" for the initial query of "cocktail table." Taking the first example, a user that successfully queries "skis" may also benefit from the search results for "ski gloves" since both items are associated with the same task.

Unrelated queries are queries that have little or no assumed or actual relation to one another, such as, for example, "baby toys" and "leather sofa." An unrelated query is one that is unlikely to provide any useful additional results to the user. It will be appreciated that the relationships between queries may be a subjective determination, such that a user searching for "baby toys" may be searching for baby toys compatible with the user's leather sofa. In that case, the queries "baby toys" and "leather sofa" are related. As will be described, in one example, the system 2 objectively determines query relationships, such as via search engine algorithms, statistics, morphology, etc. In addition to, or in lieu of, an objective determination, the system 2 may also subjectively determine query relationships, such as via a manual association of two or more queries by a user, search engine operator, advertiser, etc. and provision of such associations to the system 2.

In one embodiment, the system 2 uses co-occurrence statistics to identify the relationships between search queries stored in a query log, i.e. a list, index, database, etc. which stores queries proposed or provided by one or more users. Given two entities with multiple mentions in a large corpus, co-occurrence statistics may detect whether a relationship holds between them over their occurrences in textual patterns that are indicative for that relation. For example, various measures such as pointwise mutual information (PMI), chi-square ($\chi^2$), or log-likelihood ratio (LLR) may use the two entities' occurrence statistics to detect whether their co-occurrence is due to chance, or to an underlying relationship. The statistical relationship between the above listed types of query relationships in order of strongest to weakest should be as follows: substitutable queries, associative queries, and unrelated queries. In one embodiment, threshold values or other boundary definitions may be established to isolate the substitutable queries from the associated and unrelated queries based on the strength of their statistical relationship. Morphological tests may also be used, as will be described, to isolate the substitutable queries based on semantic similarity between the queries. Once the substitutable queries are isolated, threshold values or other boundary definitions may be established to isolate the associative queries from the unrelated queries based on their statistical relationship.

In the example of FIG. 1, the system 2 includes a query log database 4, a query log processor 6, a combination processor 8, a permutation processor 10, a substitutable log-likelihood ratio (LLR) processor 12, a subtractor 14, a morphological filter processor 16, and an associative LLR processor 18. It will be appreciated that each of the processors may be implemented in software, hardware, or a combination thereof and that one or more of the processors may be integrated together or further sub-divided into additional discrete components. It will also be appreciated that the embodiments disclosed herein may be implemented in one or more computer programs executing on one or more programmable systems comprising at least one processor and at least one data storage system. Each such program may be implemented in any desired computer language to communicate with a computer system.

In one embodiment, the query log database 4 stores one or more query logs. The query log is a text or other type of file which stores query records. A query record may be created and/or maintained by a user, e.g. as a function of their web browser, and/or a search engine, and may represent the submission of a single query, or set of queries, from a user to a search engine at a specific time, over a range of time, or over a non-consecutive series of time intervals. The query record contains data relating to the submitted search query. The data may include the query terms exactly as submitted, or variations thereof, a user identifier, and a timestamp of when the user submitted the query. The user identifier may contain information gathered from the user's browser program, such as a cookie, the IP address of the host from which the user has submitted the query, or combinations thereof. The query record may also contain other information relating to, for example, user search restrictions or search information.

In the example of FIG. 1, the query log processor 6 is coupled with the query log database 4. Herein, the phrase "coupled with" is defined to mean directly connected to or indirectly connected through one or more intermediate components. Such intermediate components may include both hardware and software based components. The query log processor 6 mines a user session derived from the query log database 4. Herein, mining may refer to analyzing or otherwise processing the data for the purpose of identifying relationships, such as patterns or associations, within the data. All of the query records in a query log that belong to a single user for a given time period, or, alternatively, set of time periods, are referred to herein as a "user session." The query log processor 6 may store the query records in, for example, a database (not shown). The query log processor 6 may also eliminate repeated queries as well as repeated query sequences identified within the user session.

The time period which specifies a given user session may be defined to encompass several hours, a day, a week, a month, or longer, and may be defined using any temporal metric, e.g. seconds, minutes, hours, etc. Shorter time periods may also be used. Further, each user session may be dynamically determined based on other factors, and may vary for a given user and/or across users. It will be appreciated that users generally focus an amount of time on a subject and submit one or more queries directed to that subject. Once the user is satisfied, the next search query, either immediately thereafter or at some later time, will be about an associated subject or a totally new subject. The user will generally start a new group of queries focused on this new subject. As a result, a user's search intent will typically vary to a greater extent as the time period which specifies the given user session is increased. Thus, a longer user session may produce a more diversified range of queries for the system 2 to analyze whereas a shorter user session may contain only a few search queries directed at the same search intent, which may lead to many substitutable queries and very little, if any, associated queries. In one example, a user session is defined, statically or dynamically, so as to encompass the search activity of the user related to a given subject.

The time period which specifies a given user session may also be triggered by a non-temporal event. For example, the time period may be defined by the number of queries submitted by the user, the number of times the user accesses a browser program, the number of times the user logs into a computer, or combinations thereof. The time period may also be defined by the number of transitions in statistical strength among query sequences. For example, if the statistical strength of the query sequences drops, the user assumedly switched search intent and the time period may be defined by this transition, or number of transitions. It will be appreciated that other non-temporal events may define the time period of the user session.

By way of example, the query log processor 6 mines a user session for a User X. FIG. 2 shows exemplary query records identified by the query log processor 6 that belong to User X. The time period which specifies the user session in this example is defined by a single day. The user identifier for User X and the timestamp for each of User X's submitted queries is assumed to be $ID_X$ and $T_1, T_2, \ldots T_7$, respectively. In the morning, User X had an initial intent of searching for a couch, designated in FIG. 2 as numeral 20. In the afternoon, User X had an associated intent of searching for other pieces of furniture, designated in FIG. 2 as numeral 22. In the evening, User X had a new intent of searching for basketball tickets, designated in FIG. 2 as numeral 24. The disclosed embodiments of system 2 may discover that the search queries "leather sofa," "leather sofa bed," and "leather couch" are substitutable queries, that the search queries "coffee table" and "cocktail table" are associated with the above substitutable queries, and that the search queries "tickets Los Angeles Lakers" and "tickets Staple Center LA Lakers" are unrelated to both the above substitutable and associated queries.

In the example of FIG. 1, the combination processor 8 is coupled with the query log processor 6. The combination processor 8 generates one or more query pair combinations based on the query records within the mined user session. A query pair combination is an un-ordered collection of unique query pairs. That is, given all of the possible query combinations computable from the search records contained with a given user session, a query pair combination represents a subset of all possible query combinations. In one example, the combination processor 8 generates query pair combinations that are likely to be determined to be substitutable query pairs. For example, a query pair combination comprising pairs of consecutive queries may provide a good model for determining substitutable query pairs since queries submitted close in time are typically focused on similar search intent. A consecutive query pair is a group of at least two query pairs immediately following one another in time. FIG. 3 shows an example of generated consecutive query pairs based on the queries submitted by User X in the exemplary user session of FIG. 2. It will be appreciated, however, that the combination processor 8 may generate other query pair combinations based on other query attributes. For example, a variation such as every other consecutive query pairs, query pair combinations submitted within a small portion of the user session, such as 30 minutes, or query pair combinations submitted within a single browser session may also be generated by the combination processor 8.

In the example of FIG. 1, the permutation processor 10 is coupled with the query log processor 6. In one example, the permutation processor 10 generates query pair permutations, i.e. arrangements of queries in which the order of the arrangement makes a difference, based on the query records within the mined user session. A query pair permutation is an ordered collection containing each query pair only once. In other words, the permutation processor 10 generates all of the possible query pair permutations from the query records of the mined user session. Generating all possible query pair permutations ensures that all associative query pair combinations are analyzed by the system 2. FIG. 4 shows an example of such query pair permutations based on the queries submitted by User X in the exemplary user session of FIG. 2. It will be appreciated that because the query pair permutations oftentimes will contain a number of associated and unrelated queries, the number of which is generally dependant on the time period specifying the user session, the query pair permutations may not provide a good indicator for substitutability, or as good an indicator as the query pair combinations, discussed above.

In another example, the permutation processor 10 generates a variation of the query pair permutations. For example, every other query pair permutation, query pair permutations submitted within one or more browser sessions, or query pair permutations submitted within a portion of the user session may be generated by the permutation processor 10. The permutation processor 10 may also generate query pair permutations from the query pairs remaining after identified query pairs having a low statistical or semantic relationship are removed. Other query pair permutations may also be generated by the permutation processor 10.

In the example of FIG. 1, the substitutable LLR processor 12 is coupled with the combination processor 8. The substitutable LLR processor 12 identifies substitutable queries from the generated query pair combinations. The substitutable LLR processor 16 may use the pair independence hypothesis likelihood ratio to identify the substitutable queries. If a query pair is represented by ($q_1$/$q_2$), where $q_1$ represents the first query and $q_2$ represents the second query, this metric tests the hypothesis that the probability of $q_2$ is the same whether term $q_1$ is seen or not by calculating the likelihood of the observed data under a binomial distribution using probabilities derived from each hypothesis, as follows:

$H_1: P(q_2|q_1)=p=P(q_2|\neg q_1)$, and $H_2: P(q_2|q_1)=p_1 \neq p_2=P(q_2|\neg q_1)$.

The likelihood score is as follows:

$$\lambda = \frac{L(H_1)}{L(H_2)}.$$

The test statistic $-2 \log \lambda$ is asymptotically $\chi^2$ distributed. Therefore, the LLR value is as follows:

$$LLR = -2\log\lambda = -2\log\frac{L(H_1)}{L(H_2)}.$$

A computed LLR value that is above a threshold LLR value suggests that there is a strong dependence between $q_1$ and $q_2$ and the query pair may be referred to as a substitutable query pair. Because of the $\chi^2$ distribution of $\lambda$, a threshold LLR value of 3.84 yields a 95% confidence that the null hypothesis can be rejected and the two queries are statistically significantly related, i.e. substitutable. However, this threshold LLR value will yield 1 in 20 spurious relationships. Because the system 2 is capable of dealing with millions of query pairs, the threshold LLR value may be set much higher, such as, for example, 50. Empirical observation shows that query pairs computed to have a LLR value greater than 50 are very good substitutable query pairs. It will be appreciated, however, that the higher the LLR value, the stronger the dependence between $q_1$ and $q_2$. Thus, if a stronger dependence between $q_1$ and $q_2$ is desired, a higher threshold LLR value, such as 100 may be used, whereas if a weaker dependence between $q_1$ and $q_2$ is desired, a lower threshold LLR value, such as 25 may be used. Other threshold LLR values may be also used depending on the desired statistical relationship between $q_1$ and $q_2$.

The substitutable LLR processor 12 may store the calculated substitutable query pairs in, for example, a database (not shown). In the example of FIG. 1, the substitutable LLR processor 12 inputs the substitutable query pairs into the subtractor 14. The subtractor 14 removes the substitutable query pairs from the query pair permutations generated by the permutation processor 10. The query pairs that do not have a computed LLR value greater than the threshold LLR value may be considered not substitutable and discarded.

In the example of FIG. 1, the morphological filter processor 16 is coupled with the subtractor 14. The morphological filter processor 16 performs morphological tests, e.g. tests based on grammatical and other variants of words that are derived from the same root or stem, on the query pair permutations to identify substitutable query pairs. In the example of FIG. 1, the morphological filter processor 16 may identify additional substitutable query pairs that may not have been identified by the substitutable LLR processor 12. If the morphological tests identify additional substitutable query pairs, the morphological filter processor 16 filters these substitutable query pairs from the query pair permutations. In another example, shown in FIG. 5, the morphological filter processor 16 identifies and removes substitutable queries from the query pair permutations prior to the subtractor 14 removing the substitutable query pairs identified by the substitutable LLR processor 12.

The morphological filter processor 16 and the subtractor 14 may also remove the substitutable query pairs from the query pair permutations simultaneously. An additional processor (not shown), however, may be needed to check which substitutable query pairs were removed by the morphological filter processor 16 and which substitutable query pairs were removed by the subtractor 14. The remaining query pair permutations can then be summed by a summor (not shown) and input into the associative LLR processor 18. It will be appreciated that the additional processor and summor in this example may be more resource intensive then the examples shown in FIGS. 1 and 5.

In one example, the morphological filter processor 16 performs an edit distance test. The edit distance test computes the total number of characters the two queries have in common. If the two queries share a large number of characters in common, the two queries may be considered substitutable. The edit distance test may be a good indicator of whether spelling variations exist between the queries.

The edit distance, also referred to as the Levenshtein distance, may be determined by the minimum number of operations needed to transform one of the queries into the other, where an operation is an insertion, deletion, or substitution of a single character. The edit distance test may be computed as follows:

Edit Distance<C % of total number of characters of $q_1$.

In one example, C is equal to 40% of $q_1$. Thus, if the edit distance is computed to be less than 40% of the total number of characters of $q_1$, the query pairs may be considered substitutable. It will be appreciated, however, that other threshold C values may be used depending on the desired similarity between the two queries. If a stronger similarity is desired, then the threshold C value may be set to a lesser value, such as 25%. Alternatively, if a weaker similarity is desired, then the threshold C value may be set to a higher value, such as 50%.

In another example, the morphological filter processor 16 performs a token number test. The token number test computes the number of tokens the two queries have in common. If the two queries share a large number of tokens in common, the two queries may be considered substitutable. The token number test may be computed as follows:

(number of tokens in common/total number of tokens in $q_1$ OR in $q_2$)*100>D %.

In one example, D is equal to 40%. Thus, if the number of tokens in common is computed to be greater than 40% of the total number to tokens in $q_1$ OR in $q_2$, the query pairs may be considered substitutable. Similar to the edit distance test, however, it will be appreciated that other D values may be used depending on the desired similarity between the two queries.

In another example, the morphological filter processor 16 performs a number of substitutions test. The number of substitutions test may compute the number of phrases the two queries have in common. The phrases may be computed in number of characters or number of tokens. If the two queries share a large number of phrases in common, the two queries may be considered substitutable. The number of substitutions test may be computed as follows:

Number of phrases in common<E.

In one example, E is equal to 1 phrase substitution; however, it will be appreciated that other E values may be used depending on the desired similarity between the two queries.

In another example, the morphological filter processor 16 performs a prefix overlap test and/or a suffix overlap test. The prefix overlap test and the suffix overlap test may be computed in number of characters or number of tokens. If the two queries share a large number of characters or tokens at the beginning of each query or at the end of each query, the two queries may be considered substitutable. The prefix overlap test and the suffix overlap test may be a good indicator of whether one of the queries is a mere refinement of the other. The prefix overlap test and suffix overlap test may be respectively computed as follows:

(number of characters or tokens in common at beginning of each query/total number characters or tokens in $q_1$ AND $q_2$)*100>$F$ %, (number of characters or tokens in common at end of each query/total number characters or tokens in $q_1$ AND $q_2$)*100>$G$ %, In one example, F and G are equal to 40%. Thus, if the number of characters or tokens in common at the beginning of each query is computed to be greater than 40% of the total number of characters or tokens in $q_1$ AND $q_2$, the query pairs may be considered substitutable. Similarly, if the number of characters or tokens in common at the end of each query is computed to be greater than 40% of the total number of characters or tokens in $q_1$ AND $q_2$, the query pairs may be considered substitutable. It will be appreciated that other values of F and G may be used depending on the desired similarity between the two queries.

The morphological filter processor 16 may perform a combination of the above described morphological tests. It will also be appreciated that the morphological filter processor 16 may perform other morphological tests to determine semantic relationships between the two queries. By way of example, FIG. 6 shows substitutable query pairs removed by the subtractor 14 and morphological filter processor 16 based on the queries submitted by User X in the exemplary user session of FIG. 2, described above.

It will be appreciated that other systems have proposed similar, as well as alternative methods for identifying substitutable query pairs, such as those described in U.S. patent application Ser. Nos. 11/200,851 and 11/202,388 entitled "System and Method for Determining Alternate Search Queries" and "Alternative Search Query Processing in a Term Bidding System", now U.S. Pat. Nos. 2007/0038621 and 2007/0038602 respectively, both filed on Aug. 10, 2005 and incorporated herein by reference. These other methods may be used in connection with or in lieu of the substitutable LLR processor 12, morphological filter processor 16, and associative LLR processors 18 described below.

Figure 5:
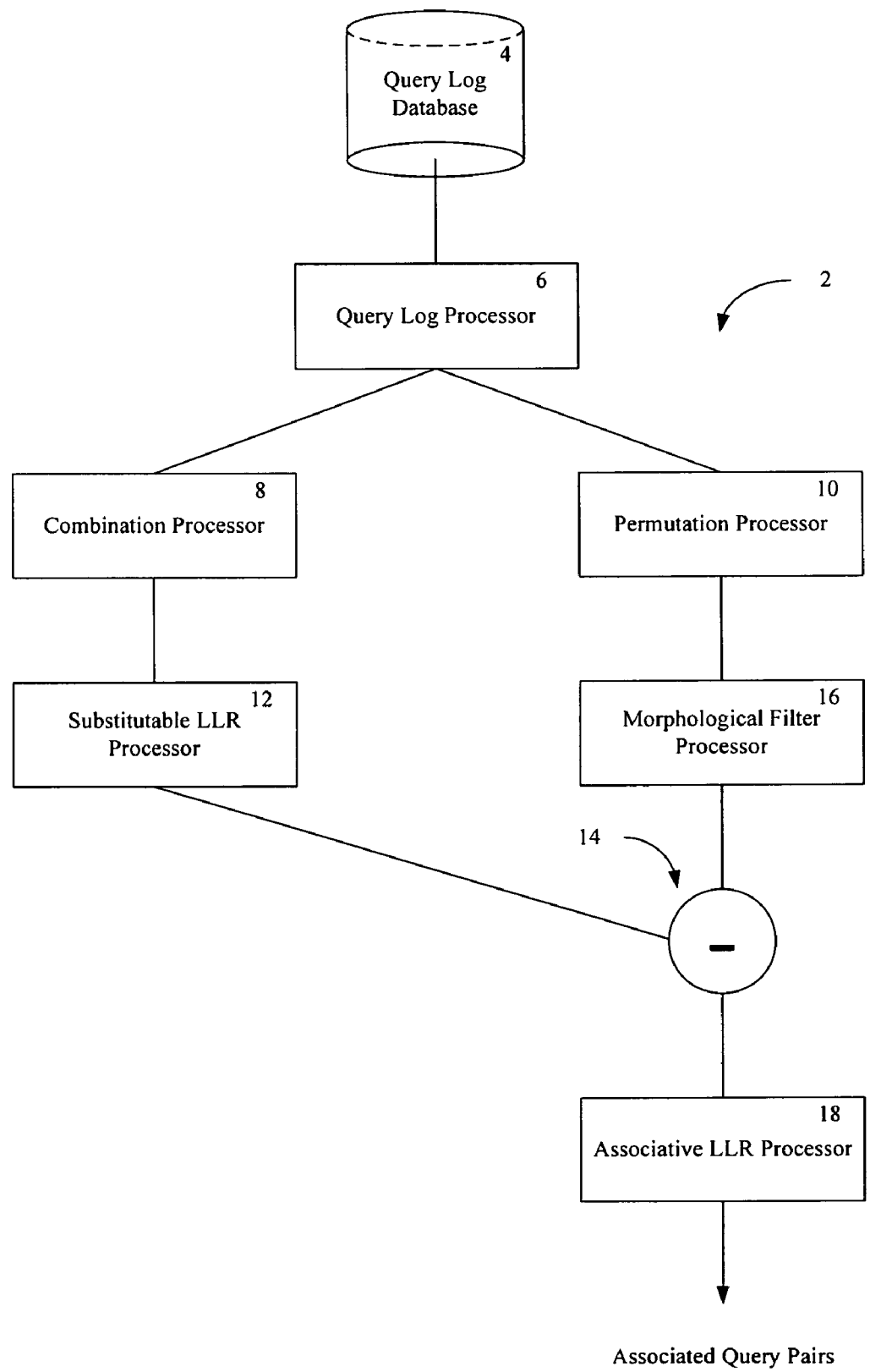
FIG. 5 is a block diagram of an exemplary system for discovering associated intent queries from search web logs.

After the subtractor 14 and the morphological filter processor 16 have removed the substitutable query pairs from the query pair permutations, only the associated query pairs and unrelated query pairs should remain. In the example of FIG. 1, the associative LLR processor 18 is coupled with the morphological filter processor 16. In the example of FIG. 5, the associative LLR processor 18 is coupled with the subtractor 14. The associative LLR processor 18 may perform a similar LLR test, or a variation thereof, as the substitutable LLR processor 12, described above. In one example, the substitutable LLR processor 12 uses a normalized frequency count for the query pair permutations. It will be appreciated that a side effect of computing the query pair permutations may be having each query occurring up to as many queries in the user session, even though the user only issued the query a single time. For example, if a search query occurs in a user session containing 50 queries, the search query will be in 49 of the generated query pair permutations. The normalized frequency count avoids giving queries from longer user sessions an overwhelming weight. The normalization may be computed by giving a weight to each of the query pair permutations generated for a user session, where the weight is equal to:

(total number of queries for the user session/number of remaining query pairs after removing the substitutable query pairs).

FIG. 7 shows exemplary weights and LLR values computed by the associative LLR processor 18 for a number of query pairs based on the queries submitted by User X in the exemplary user session of FIG. 2, described above. In this example, the weight and LLR values were computed from 700 million query pairs derived from millions of user sessions, not just the exemplary user session of User X. It may be seen by the example in FIG. 7 that after the substitutable query pairs are removed from the query pair permutations, the associated query pairs have a stronger statistical relationship, represented by the higher LLR values, whereas the unrelated query pairs have the weaker statistical relationship, represented by the lower LLR values.

Similar to the threshold LLR value discussion with respect to the substitutable LLR processor 12, empirical observation shows that query pairs computed to have a LLR value greater than 50 are very good associative query pairs and thus, the associative LLR processor 18 may have a threshold LLR value equal to 50. It will be appreciated however, that if a stronger dependence between $q_1$ and $q_2$ is desired, a higher threshold LLR value, such as 100 may be used, whereas if a weaker dependence between $q_1$ and $q_2$ is desired, a lower threshold LLR value, such as 25 may be used. Other threshold LLR values may be also used depending on the desired statistical relationship between $q_1$ and $q_2$.

The associative LLR processor 18 may store the calculated associated query pairs in, for example, a database (not shown). The query pairs that do not have a computed LLR value greater than the threshold LLR value may be considered unrelated and discarded.

Figure 8:
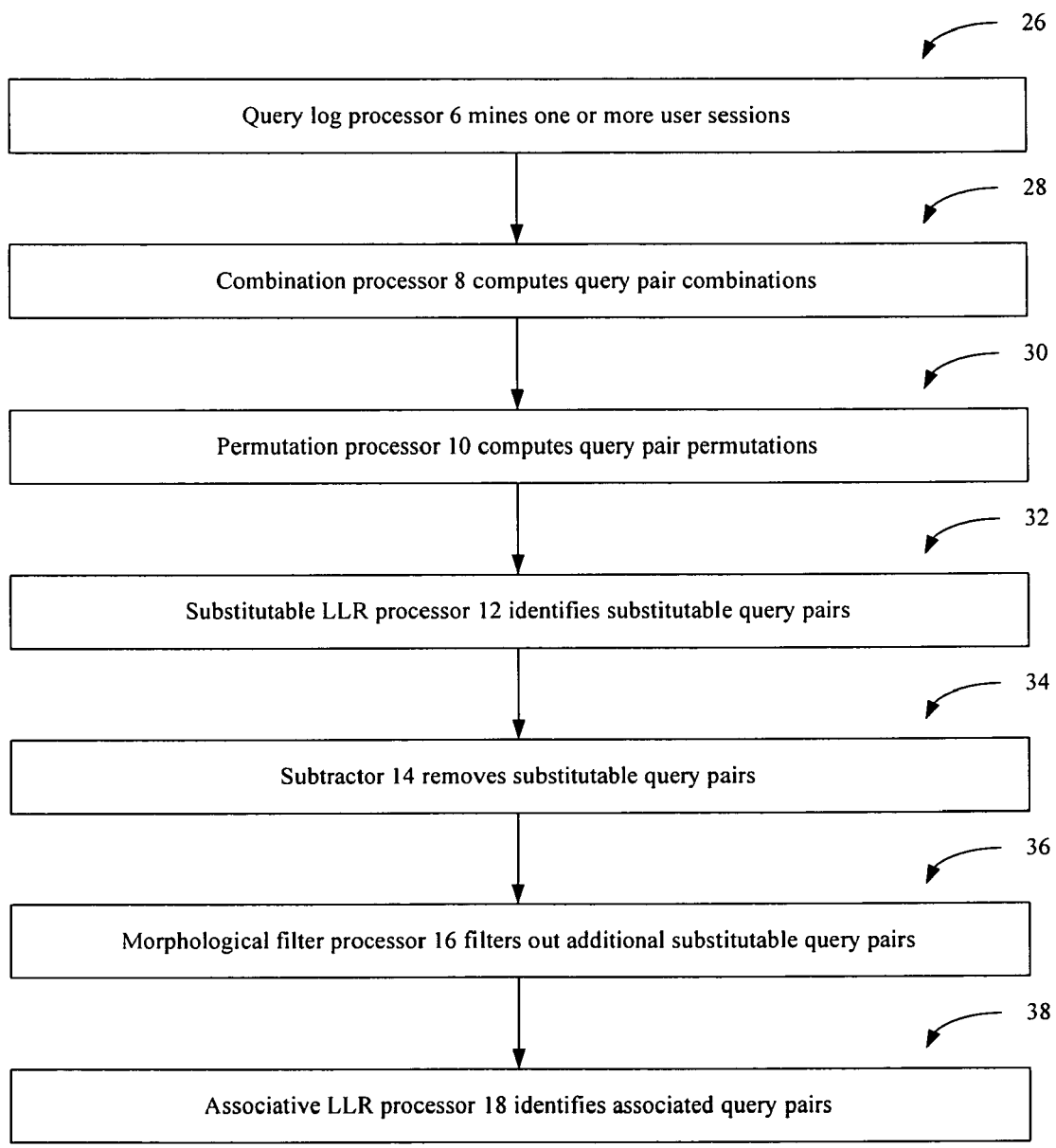
FIG. 8 is a flow chart of one example of the operation of an exemplary system for discovering associative intent queries from search web logs.

FIG. 8 shows a flow chart of one example of the operation of system 2. In block 26, the query log processor 6 mines one or more user sessions comprising query records from query logs stored in the query log database 4. In block 28, the combination processor 8 computes query pair combinations based on one or more user sessions. In block 30, the permutation processor 10 computes query pair permutations based on the one or more user sessions. In block 32, the substitutable LLR processor 12 identifies substitutable query pairs from the query pair combinations. In block 34, the subtractor 14 removes the identified substitutable query pairs from the query pair permutations. In block 36, the morphological filter processor 16 filters out additional substitutable query pairs from the query pair permutations. In block 38, the associative LLR processor 18 identifies the associated query pairs.

Figure 9:
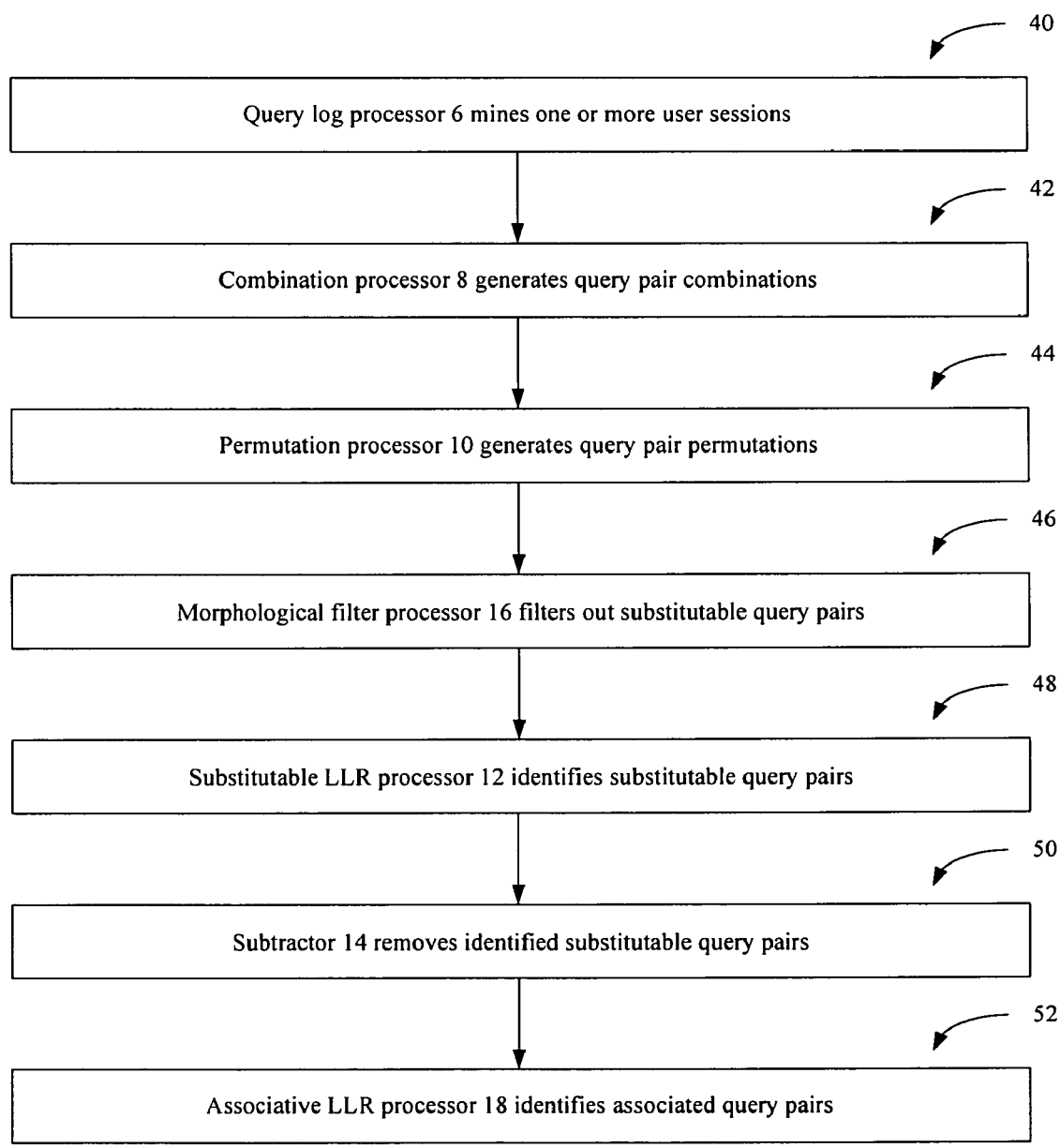
FIG. 9 is a flow chart of one example of the operation of an exemplary system for discovering associative intent queries from search web logs.

FIG. 9 shows a flow chart of another example of the operation of system 2. In block 40, the query log processor 6 mines one or more user sessions comprising query records from query logs stored in the query log database 4. In block 42, the combination processor 8 generates query pair combinations based on the one or more user sessions. In block 44, the permutation processor 10 generates query pair permutations based on the one or more user sessions. In block 46, the morphological filter processor 16 filters out substitutable query pairs from the query pair permutations. In block 48, the substitutable LLR processor 12 identifies substitutable query pairs from the query pair combinations. In block 50, the subtractor 14 removes the identified substitutable query pairs from the remaining query pair permutations. In block 52, the associative LLR processor 18 identifies the associated query pairs.

The associated query pairs may be used by a search engine to offer suggestions to the user of other queries or to other users, associated with the user's submitted query. The associated query may provide the user with additional and/or alternative results. In this regard, the associated queries may be used in a web-assisted search tool to help focus, expand, or diversify a user's searching. For example, the search engine may suggest an associated subject such as "solar eclipse" when a user is about to finish a search session about "tides prediction." The suggestion may keep the user's interest and prolong the user's searching. The associated queries may also be used in a suggestions tool on a commercial website. For example, if a user buys a "baby stroller," the commercial website operator may suggest that the user also buy "baby toys," since the two queries are associated. The associated queries may also provide a user with the searching expertise acquired by previous users who may have refined their search queries. The associated queries may also be used in an auto-complete tool for a text field. For example, if a user begins keying in "baby stroller," the auto-complete tool may dynamically suggest "baby toys," along with other similar and associated queries.

Moreover, a search engine operator, advertiser, search engine advertising tool, etc. may use the associated queries to offer more diverse advertisements to the user. There are many query terms that are not currently matched with an advertisement, however, these query terms may be associated with other query terms that are matched with an advertisement. Thus, when the user submits a query, the advertisement matched with the query, if one exists, in addition to the advertisement matched with the query associated with the submitted query may be displayed to the user. For example, when the user submits "baby toys," the advertising search engine may display to the user an advertisement directed to "baby stroller." Even if an advertisement exists for "baby toys," the user may still benefit from an advertisement for "baby stroller" because both of the terms are associated with babies.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method for discovering an associated query pair comprising:

mining, by a computer, a user session derived from a query log database, wherein the user session comprises at least one query record, the query record comprising a plurality of queries submitted during a defined time period, wherein the time period is delineated by a non-temporal event comprising detecting a switch in search intent by the user;

generating, by the computer, a set of query pairs based on the user session, wherein the set of query pairs comprises an unordered collection of unique query pair combinations having particular attributes;

removing, by the computer, a substitutable query pair from the set of query pairs, wherein substitutable comprises queries that are interchangeable or semantically similar; and discovering, by the computer, an associated query pair from the set of remaining query pairs, wherein the queries of the associated query pair share a mutually-related subject matter without being substitutable.

2. The method of claim 1 wherein the query record further comprises a user identifier, a timestamp, or combinations thereof.

3. The method of claim 1 wherein the set of query pairs comprises a first set of query pairs, the removing further comprises:

generating a second set of query pairs based on the mined query log; and performing a statistical test on the second set of query pairs to determine the substitutable query pair.

4. The method of claim 3 wherein the statistical test comprises a log-likelihood ratio (LLR) test and wherein the similar query pair has a computed LLR value greater than a threshold LLR value.

5. The method of claim 1 wherein the removing further comprises:

performing at least one morphological test on the set of query pairs to determine the substitutable query pair.

6. The method of claim 5 wherein the at least one morphological test comprises at least one of an edit distance test, a token number test, a number of substitutions test, a prefix overlap test, a suffix overlap test, or combinations thereof.

7. The method of claim 1 wherein the discovering further comprises:

performing a log-likelihood ratio (LLR) test on the set of remaining query pairs, wherein the associated query pair has a determined LLR value greater than a threshold LLR value.

8. The method of claim 1 further comprising:

offering a search suggestion to a user by at least one of an Internet search engine, intranet search engine, personal search engine, mobile search engine, or combinations thereof, wherein the search suggestion is associated with a user submitted search query and based on the discovered associated query pair.

9. The method of claim 1 further comprising:

offering to a user an advertisement associated with a user submitted search query and based on the discovered associated query pair.

10. A computer-implemented method for discovering an associated query pair comprising:

generating, by a computer, a group of query pairs based on a user session, wherein the user session comprises at least one query record, the query record comprising a plurality of queries submitted during a time period delineated by a non-temporal event comprising detecting a switch in search intent by the user, wherein the set of query pairs comprises an unordered collection of unique query pair combinations having particular attributes;
removing, by the computer, a substitutable query pair from the group of query pairs, wherein substitutable comprises queries that are interchangeable or semantically similar; and
performing, by the computer, a statistical test on the group of remaining query pairs to discover an associated query pair, wherein the queries of the associated query pair share a mutually-related subject matter without being substitutable.

11. The method of claim 10 wherein the group of query pairs comprises a query pair permutation.

12. The method of claim 10 wherein the group of query pairs comprises a first group of query pairs, the removing further comprising:
generating a second group of query pairs based on the user session; and
performing a statistical test on the second group of query pairs to determine the similar query pair.

13. The method of claim 12 wherein the second group of query pairs comprises a query pair combination.

14. The method of claim 10 wherein the removing further comprises:
performing at least one morphological test on the group of query pairs to determine the substitutable query pair.

15. The method of claim 14 wherein the at least one morphological test comprises at least one of an edit distance test, a token number test, a number of substitutions test, a prefix overlap test, a suffix overlap test, or combinations thereof.

16. The method of claim 10 wherein the statistical test comprises a log-likelihood ratio (LLR) test and wherein the performing further comprises:
identifying the associated query pair from the group of query pairs that have a LLR value greater than a threshold LLR value.

17. A computer system for identifying an associated query pair comprising:
a query log processor of a computer operable to mine a user session, wherein the user session comprises at least one query record, the query record comprising a plurality of queries submitted during a defined time period;
a query log database coupled with the computer to store the at least one query record of the user session, wherein the query log database is stored in a data storage system coupled with the query log processor;
a permutation processor coupled with the query log processor and the query log database and operable to generate and store in the query log database a set of query pairs based on the user session, wherein the set of query pairs comprises an unordered collection of unique query pair combinations having particular attributes;
a subtractor coupled with the permutation processor and operable to remove a substitutable query pair from the set of query pairs, which are deleted from the query log database, wherein substitutable comprises queries that are interchangeable or semantically similar; and
an associative log-likelihood ratio (LLR) processor coupled with the subtractor and operable to identify an associated query pair from the set of remaining query pairs, and to isolate within the query log database the associated query pair from unrelated queries, wherein the queries of the associated query pair share a mutually-related subject matter without being substitutable.

18. The computer system of claim 17 wherein the set of query pairs comprises a first set of query pairs, the system further comprising:
a combination processor coupled with the query log processor and operable to generate a second set of query pairs based on the user session;
a substitutable LLR processor coupled with the combination processor and operable to perform a statistical test on the second set of query pairs to identify the similar query pair.

19. The computer system of claim 17 further comprising:
a morphological filter processor coupled with at least one of the permutation processor, the subtractor, or combinations thereof, and operable to perform at least one morphological test on the set of query pairs to identify the similar query pair.

20. The computer system of claim 17 wherein the associative LLR processor is further operable to perform a LLR test on the set of remaining query pairs to identify the associated query pair, wherein the associated pair has a LLR value greater than a threshold LLR value.

21. The computer system of claim 20 wherein associative LLR processor is further operable to perform the LLR test using a normalized frequency count for the set of query pairs.

22. A computer system for discovering an associated query pair comprising:
means for mining, by a computer, a user session including query records derived from a query log database coupled with the computer, wherein the user session comprises at least one query record, the query record comprising a plurality of queries submitted during a defined time period delineated by a non-temporal event comprising detecting a switch in search intent by the user;
means for storing, by the computer, the user session, including the at least one query record, wherein the means for storing is stored in a data storage system coupled with the means for mining;
means, coupled with the means for mining and with the means for storing, for generating a set of query pairs based on the user session, wherein the set of query pairs comprises an unordered collection of unique query pair combinations having particular attributes and are stored in the means for storing;
means, coupled with the means for generating, for removing a substitutable query pair from the set of query pairs, which are deleted from the means for storing, wherein substitutable comprises queries that are interchangeable or semantically similar; and
means, coupled with the means for removing, for discovering an associated query pair from the set of remaining query pairs, and to isolate within the query log database the associated query pair from unrelated queries, wherein the queries of the associated query pair share a mutually-related subject matter without being substitutable.

23. A computer system for discovering an associated query pair comprising computer programming logic stored in a memory and executable by a processor coupled with the memory, the computer programming logic comprising:
a computer having a query log processor:
first logic of the computer operative to mine a user session derived from a query log database coupled with the computer, wherein the user session comprises at least one query record stored in the query log database, the query record comprising a plurality of queries submitted during a defined time period delineated by a non-temporal event comprising detecting a switch in search intent by the user, wherein the query log database is stored in a data storage system coupled with the query log processor;

second logic of the computer coupled with the first logic and operative to generate a set of query pairs based on the user session, wherein the set of query pairs comprises an unordered collection of unique query pair combinations having particular attributes;

third logic of the computer coupled with the second logic and operative to remove a substitutable query pair from the set of query pairs; and fourth logic of the computer coupled with the third logic and operative to discover an associated query pair from the set of remaining query pairs, wherein the queries of the associated query pair share a mutually-related subject matter without being substitutable.

24. The computer system of claim 17 wherein the time period is delineated by a non-temporal event comprising detecting a switch in search intent by the user.

* * * * *